United States Patent [19]

Baker et al.

[11] Patent Number: 4,601,484
[45] Date of Patent: Jul. 22, 1986

[54] IMPLEMENT PULLING HITCH ASSEMBLY

[76] Inventors: Robert S. Baker, R.R. 1, Alva, Okla. 73717; Joe E. Sternberger, R.R. 1, Hardtner, Kans. 67057

[21] Appl. No.: 743,140

[22] Filed: Jun. 10, 1985

Related U.S. Application Data

[63] Continuation-in-part of Ser. No. 544,944, Oct. 24, 1983, abandoned.

[51] Int. Cl.⁴ .............................................. B60D 1/00
[52] U.S. Cl. ................................. 280/411 C; 280/412
[58] Field of Search ........... 280/411 C, 411 A, 411 R, 280/412

[56] References Cited

U.S. PATENT DOCUMENTS

| | | | |
|---|---|---|---|
| 2,955,848 | 10/1960 | Hyland et al. | 280/411 C |
| 3,738,682 | 6/1973 | Ritter . | |
| 4,213,628 | 7/1980 | Hardesty | 280/412 |
| 4,344,639 | 8/1982 | Pollard . | |

FOREIGN PATENT DOCUMENTS 388693  5/1973  U.S.S.R. .......................... 280/411 C

Primary Examiner—John J. Love
Assistant Examiner—Donn McGiehan
Attorney, Agent, or Firm—Robert K. Rhea

[57] ABSTRACT

A multiple implement to tractor hitch assembly. A horizontally disposed elongated first beam is horizontally curved and connected intermediate its ends by a tongue with a tractor drawbar for horizontal pivoting movement of the first beam about the vertical axis of its tongue connection for positioning implements when connected with respective parallel end portions of the beam in a tandem or laterally spaced soil working position by a power cylinder extending between the first beam and the tongue. A second substantially identical beam is hingedly connected in tandem by one of its ends to the trailing end of the first beam for vertical pivoting movement of the beams about the horizontal hinge connection. An agricultural implement is connected with the beams at their hinged connection and with the respective other end of the respective beam.

2 Claims, 2 Drawing Figures

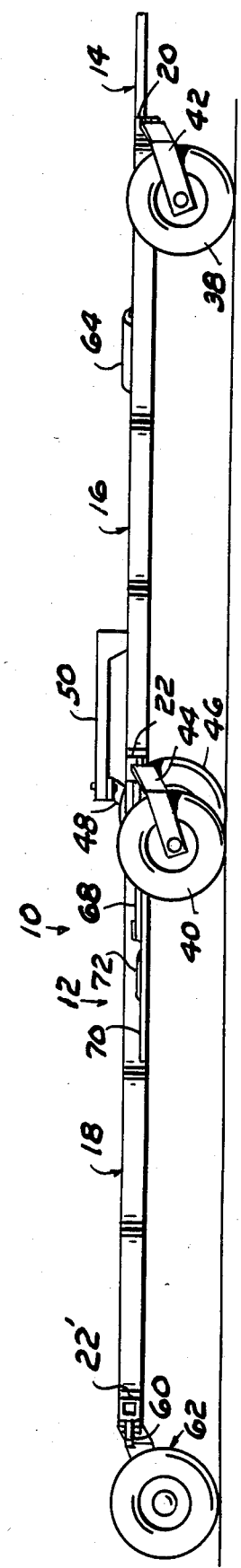

IMPLEMENT PULLING HITCH ASSEMBLY

This application is a continuation-in-part of an application filed by me in the U.S. Patent and Trademark Office for IMPLEMENT PULLING HITCH ASSEMBLY on Oct. 24, 1983, Ser. No. 06/544,944, now abandoned.

BACKGROUND OF THE INVENTION

1. Field of the Invention

The present invention relates to implement hitches and more particularly to a hitch permitting a plurality of agricultural implements to be drawn by a tractor in tandem or laterally disposed for maximum coverage of soil being cultivated, treated or planted.

2. Description of the Prior Art

In many agricultural operations it is desirable to tow a plurality of implements behind a single tractor with the implements extending generally transversely of the direction of travel for covering a maximum expanse of soil. In such an arrangement, it is necessary that the hitch connecting the implements to the tractor permit disposing the implements in tandem fashion for moving over-the-road, through gates, or the like, from one field to another. Since the mass of agricultural implements, such as grain drills, particularly when filled with grain to be planted, is considerable, the hitch, drawbar or bars connecting the implements to the tractor must be of rugged construction and even when wheel supported presents considerable mass rendering it impractical to attempt manual manipulation of such hitches for changing the orientation from a tandem implement transport position to a transverse position, rearward and laterally of the tractor for working the field. It is necessary that the hitch be power operated preferably from the operator's position on the tractor.

The Pollard U.S. Pat. No. 4,344,639 discloses a dual agricultural implement hitch which includes a horizontal tongue pivotally connecting the tractor to a first implement and an upwardly curved beam connected with the tongue and extending rearwardly over the first implement for connection with a second implement. A power cylinder extends between the tongue and first implement for biasing the tongue and beams in opposing horizontal directions and disposing the implements in tandem or lateral soil working positions.

The Ritter U.S. Pat. No. 3,738,682 discloses a horizontal drawbar transversely connected with a tractor for pulling a first implement and includes rearwardly extending coupling means at the respective ends of the drawbar for connecting additional implements thereto. Movement of the coupling bars toward and away from each other is accomplished by a pair of power cylinders at each end of the drawbar which move the implement coupling bars toward and away from each other for an implement tandem arrangement or laterally disposed soil conditioning configuration.

The hitch of this invention is distinctive over the prior art and the above two patents by a tongue connecting a tractor to an elongated horizontally curved implement hitch having an implement connected with respective end members in which the curved hitch is pivoted about the vertical axis of its connection with the tongue for positioning the drawn implements in tandem or laterally disposed relation.

SUMMARY OF THE INVENTION

First and second generally C-shaped horizontal wheel supported implement hitch members are connected in tandem. A tractor connected tongue is pivotally connected with the forward implement hitch intermediate its ends. A power cylinder extends between a lateral portion of the forward hitch member and its juncture with the tongue for horizontally pivoting the hitch members as a unit, in combination with forward movement with the tractor, about the vertical axis of the connection of the hitch with the tongue from an implement tandem travel position to a laterally spaced field working position.

The principal object of this invention is to provide a relatively simple, in construction and operation, multiple agricultural implement hitch for towing a plurality of implements in close coupled relation behind a single tractor for over-the-road travel and soil working positions in which the implement hitch is easily pivoted horizontally about the vertical axis of its tractor connection from a travel to a field working position and vice versa.

DESCRIPTION OF THE PREFERRED EMBODIMENTS

Figure 1:
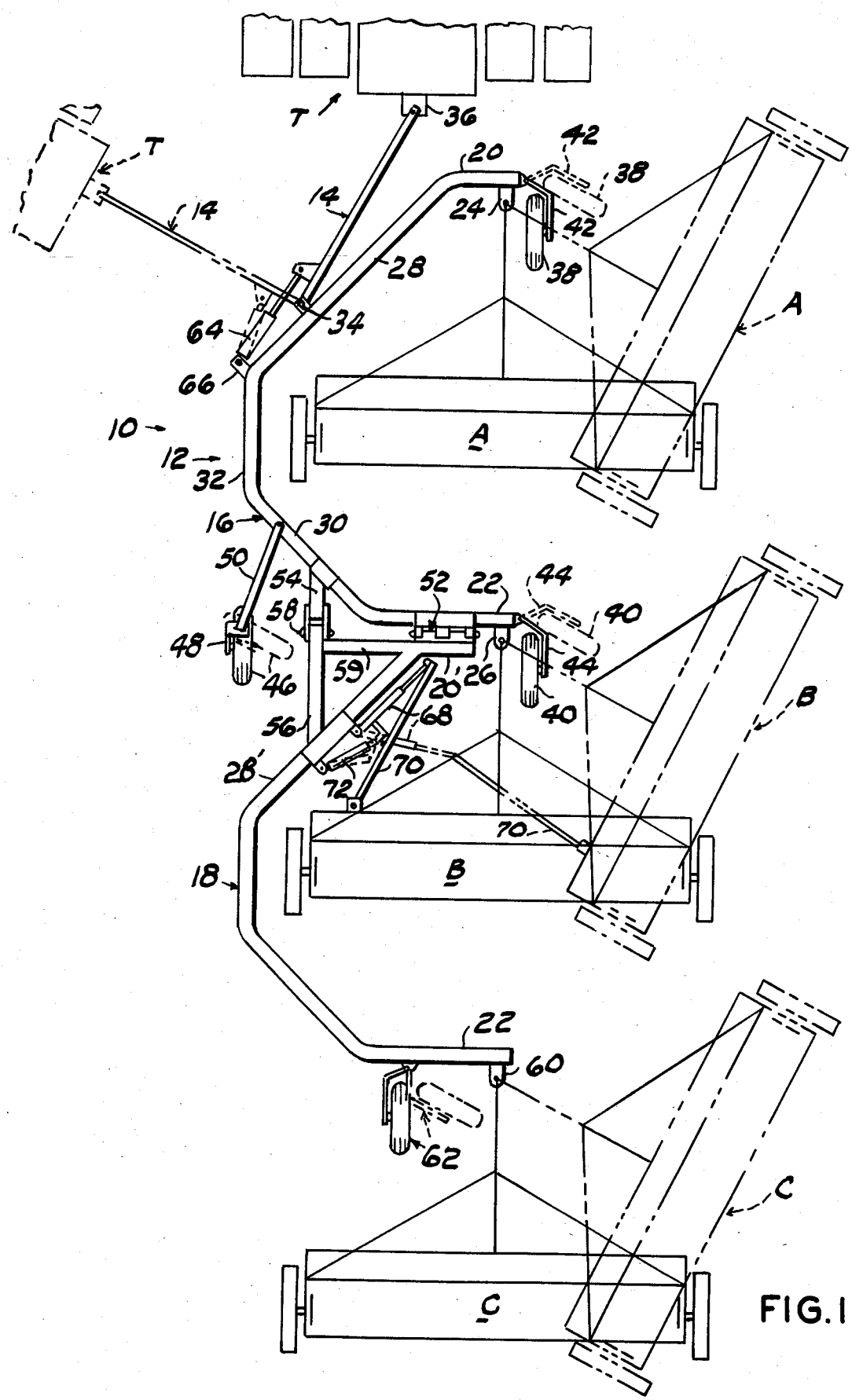
FIG. 1 is a top view of the pulling hitch connected with a tractor and grain drills during over-the-road travel and illustrating, by phantom lines, the relative seed planting position of the hitch, tractor and grain drills; and, FIG. 2 is a right side elevational view of the hitch, per se.

Like characters of reference designate like parts in those figures of the drawings in which they occur.

In the drawings:

The reference numeral 10 indicates the pulling hitch assembly comprising a principally tubular horizontally disposed beam assembly 12 connected with a prime mover, such as a tractor T, by a tongue member 14. The beam assembly 12 comprises first and second elongated beams 16 and 18, respectively, which are each curved intermediate its ends to substantially define a semi-circular or C-shape, as viewed in FIG. 1. The forward and rearward end portions 20 and 22 of the beam 16 project in the same direction in parallel relation and are each provided adjacent their respective free ends with implement coupling means formed by rearwardly projecting vertically apertured lugs 24 and 26 parallel with the tractor travel path, as viewed in FIG. 1, for connection with the tongue of an implement, as presently explained. The spacing between the beam 16 end portions 20 and 22 is at least greater than the overall fore to aft dimension of an agriculture implement to be used therewith.

Intermediate portions of the beam 16 define a forward lateral angular section 28, a rearward lateral angular section 30 with the sections 28 and 30 joined by an intermediate section 32 parallel with respect to the travel path horizontally extending between the apertured lugs 24 and 26. One end of the tongue 14 is connected with the beam 16 intermediate the length of its forward angular section 28 by a vertical hinge pin 34 and the other end of the tongue is pivotally connected with the tractor drawbar 36. The connection of the tongue with the tractor drawbar 36 permits the tractor to move up and down relative to the tongue and pulling hitch 10 when traversing uneven soil. The length of the tongue 14 is such that it terminates adjacent the forward limit of the beam 16.

A pair of wheels 38 and 40 are respectively connected in a substantially conventional manner with the forward and rearward end portions 20 and 22 of the beam 16 by suitable pivotally connected legs 42 and 44, respectively, permitting the wheels 38 and 40 to pivot horizontally in caster wheel fashion about the vertical axis connection of the leg connection with the respective beam end for the purposes presently apparent.

Similarly, a third wheel 46, journalled by a wheel support 48, is pivotally connected about a vertical axis with an arm 50 mounted in cantilever fashion on the beam 26 intermediate the rearward angular section 30. The wheels 38, 40 and 46 thus support the beam assembly 16 in mobile fashion.

The second or rearward beam 18 similarly includes forward and rearward end portions 20' and 22', respectively, and a laterally and rearwardly directed forward angular section 28'. The rearward beam forward end portion 20' is hingedly connected with the first or forward beam 16 rearward end portion 22 by hinge means 52 for vertical pivoting movement about the horizontal axis of the hinged means of either beam 16 or 18 with respect to the other. A pair of axially aligned brace members 54 and 56 extend horizontally between and are connected with the forward beam angular section 30 and the rearward beam angular section 28'. The braces 54 and 56 are joined by other hinge means 58 having its horizontal axis axially aligned with the axis of the hinge means 52. The rearward beam forward end portion 20' is extended, as at 59, to intersect and connect with the rearward brace 56 to further anchor the two beams 16 and 18 together.

The rearward beam end portion 22' is similarly provided with an implement coupling apertured lug 60 aligned with the implement lugs 24 and 26. A caster-type support wheel 62, connected with the beam end portion 22', supports the rearward portion of the beam assembly 18.

The tongue 14 is maintained parallel with or at an acute angle with respect to the forward beam forward section 28 by a double acting pressure cylinder 64. The aligned apertured lugs 24, 26 and 60 are maintained parallel with the connection of the tongue to the tractor hitch 36 with the longitudinal axis of the tractor during over-the-road movement by the hinged connection of the two beams. The piston rod of the cylinder 64 is pivotally connected with the tongue 14 adjacent its connection with the beam 16 and the other end of the cylinder 64 is pivotally connected with a beam lug 66 rearwardly of the tongue connection.

A first implement stabilizer link 68 is pivotally connected at one end portion to the beam section 28' substantially opposite its point of connection with the beam brace 56. A second stabilizer link 70 is pivotally connected at one end to the other end of the first stabilizer link. A link control double acting pressure cylinder 72 is pivotally connected at its respective ends with the beam section 28' and first stabilizer link 68 for maintaining a desired position of the stabilizer links, as presently explained. The two cylinders 64 and 72 are connected, by flexible tubing, not shown, with the tractor power supply through conventional controls, similarly not shown. The flexible tubing is supported by the tongue and/or other components of the beam assembly.

OPERATION

As disclosed hereinabove, the tongue 14 is connected with the tractor hitch 36 and first, second and third implements, such as grain drills, A, B and C, respectively, are connected by their respective tongue to the respective apertured lug 24, 26 and 60. The stabilizer bar 70 is connected to a forward edge portion of the implement B to prevent yawing of the implements due to the terrain being traveled while tilling the soil or during over-the-road movement, through gates and from one field to another.

For over-the-road travel the hitch assembly 10 is disposed, as illustrated by solid lines (FIG. 1), in which the implements A, B and C are arranged in tandem with their center line of travel aligned and parallel with the travel direction of the tractor T. When it is desired to dispose the grain drills for planting, the tongue 14 is disposed, as illustrated by phantom lines. This is accomplished while the tractor and implements are moving forwardly. The tractor operator, by operating tractor controls, not shown, retracts the piston rod of the power cylinder 64 which pulls the tongue 14 toward the left, as viewed in FIG. 1, resulting in a clockwise pivoting of the entire hitch 10 which moves the major portion of the beam assembly 12 horizontally toward the left, as viewed in the drawings, by pivoting the beam assembly 12 about the vertical axis of its connection 34 with the tongue 14. This results in lateral displacement of the implements A, B and C in which the lateral displacement is such that the adjacent end limits of adjacent implements slightly overlap in tracking relation, as illustrated by phantom lines. Simultaneously, with the pivoting of the beam assembly 12, the stabilizer bar cylinder 72 is actuated for pivoting the stabilizer bars 48 and 70 rearwardly which, by their connection with the implement B maintains this implement and the hitch assembly stabilized in the direction of travel of the tractor.

Conversely, when it is again desired to disposed the hitch assembly in down-the-road travel position and the implements arranged in tandem relation, the pistons of the cylinders 64 and 72 are operated in the opposite direction, while the entire apparatus is moving forwardly, thus pivoting the beam assembly 12 about its vertical axis with the tongue 14 toward the solid line position (FIG. 1).

Obviously the invention is susceptible to changes or alterations without defeating its practicability. Therefore, we do not wish to be confined to the preferred embodiment shown in the drawings and described herein.

We claim:

1. An implement pulling hitch assembly, comprising: beam means including first and second rigid unitary elongated horizontally curved beams each having its respective end portions facing the same direction in spaced-apart relation, said second beam being hingedly connected by one of its end portions with one end portion of the first said beam for vertical pivoting movement of both beams with respect to each other about a horizontal axis;

coupling means at the hinged juncture of said beams and on the respective other end portion of said beams for connecting agricultural implements thereto;

tongue means including an elongated tongue adapted to be pivotally connected at one end portion with a tractor hitch and hingedly connected at its other end portion with one end portion of said beam means for horizontal pivoting movement with respect to each other about a vertical axis;

a plurality of ground engaging caster wheel means mounted on and horizontally supporting said beam means above the surface of the earth; and, power means including a single pressure operated cylinder extending between and connecting the tongue with said one end portion of said first beam for horizontally pivoting said beam means about the vertical axis and moving said beam end portions from a laterally directed implement tandem travel position to a rearwardly directed implement laterally offset forward to rearward staggered soil planting position.

2. The hitch assembly according to claim 1 and further including:

implement stabilizing means including pivotally interconnected links extending between and pivotally connected with said second beam and an agricultural implement connected therewith; and, other power cylinder means mounted on said second beam and operatively connected with said stabilizing means for extending and retracting the stabilizing links.

* * * * *